May 4, 1965 S. BACKLUND 3,181,854
MOTOR VEHICLE AIR SUSPENSION LEVELING VALVE
Original Filed Feb. 11, 1957 2 Sheets-Sheet 1

S. BACKLUND
INVENTOR.

BY E. C. McRae
J. R. Faulkner
F. H. Oster

ATTORNEYS

United States Patent Office 3,181,854
Patented May 4, 1965

3,181,854
MOTOR VEHICLE AIR SUSPENSION LEVELING VALVE
Sven Backlund, St. Paul, Minn., assignor to Ford Motor Company, Dearborn, Mich., a corporation of Delaware
Continuation of application Ser. No. 639,290, Feb. 11, 1957. This application Oct. 19, 1959, Ser. No. 847,428
14 Claims. (Cl. 267—65)

This invention relates generally to a motor vehicle air suspension and particularly to a leveling system for such a suspension.

This application is a continuation of application Serial No. 639,290, filed February 11, 1957, entitled Motor Vehicle Air Suspension Leveling Valve, now abandoned.

An object of the invention is to provide a leveling valve for a motor vehicle air suspension system designed to regulate the amount of air in an air spring in response to the loading of the vehicle and to provide fluid damping means preventing actuation of the leveling valve during temporary periods of changed vehicle attitude such as during braking and acceleration, during cornering and when encountering road irregularities. A further object is to provide a damped leveling valve of this character, incorporating means permitting a rapid return of the damped member of the valve to prevent the hunting which may occur in leveling valves of this type. In an embodiment of the invention, this is accomplished by providing a vane movable in a fluid chamber and having an auxiliary vane positioned on each side of the main vane and spring urged into engagement therewith. The auxiliary vanes are slightly smaller in area than the cross-sectional area of the chamber to provide a restricted fluid flow therebetween, while the main vane is considerably smaller in area. During movement of the main vane in either direction from its normal position, it carries one of the auxiliary vanes with it, and the restriction between the auxiliary vane and the fluid chamber provides the necessary damping to effect the desired time delay in the operation of the leveling valve. On the return stroke the main vane is allowed to return rapidly to its neutral position by reason of the relatively large clearance between the main vane and the fluid chamber while the auxiliary vane returns later at a slower rate. This provides a more stable leveling valve and eliminates objectionable hunting which might otherwise occur and which would impair the proper valve operation and would result in repeated undesirable and unnecessary changes in the vehicle height.

Other objects and advantages of this invention will be made more apparent as this description proceeds, particularly in connection with the drawings in which.

Figure 3:
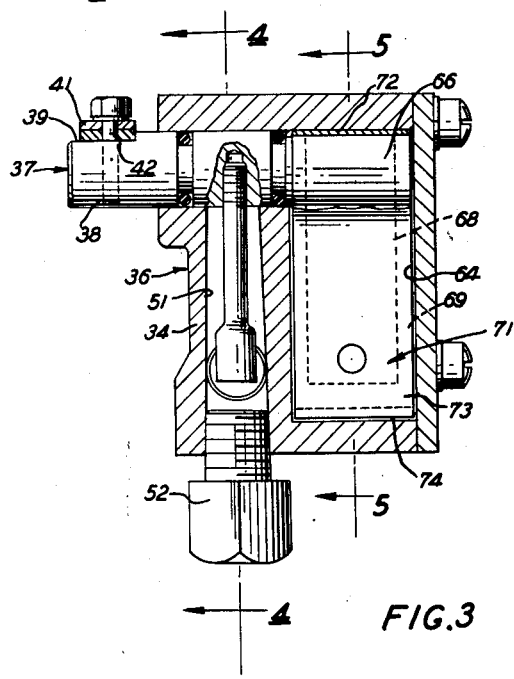
FIGURE 3 is an enlarged cross-sectional view of the valve shown in FIGURE 1.
Figure 4:
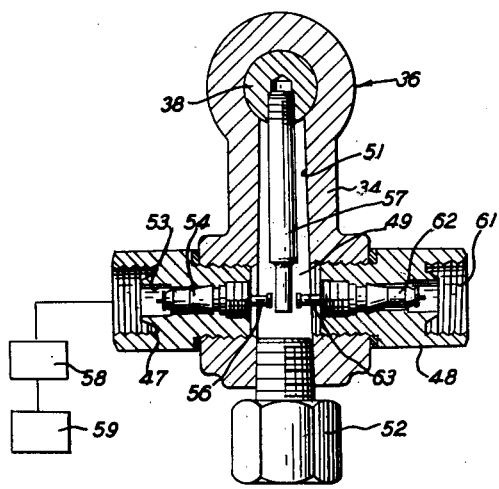
Figure 5:
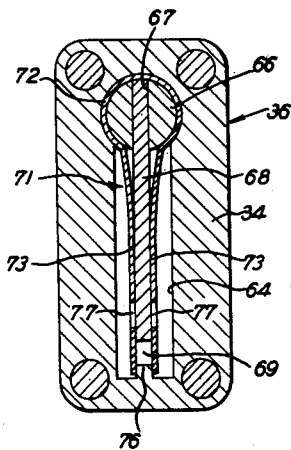
Figure 6:
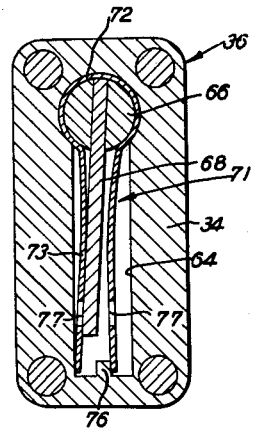

FIGURES 4 and 5 are cross-sectional views taken on the lines 4—4 and 5—5 of FIGURE 3;

FIGURE 6 is a cross-sectional view similar to FIGURE 5, but with the parts thereof in a different position.

Figure 1:
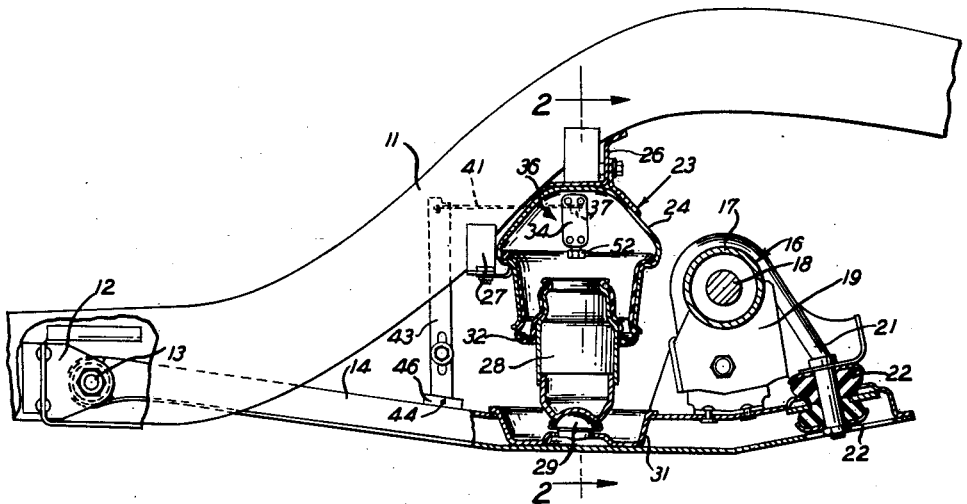
FIGURE 1 is a side elevation view, partly broken away and in section, of a motor vehicle wheel suspension incorporating the present invention.

Referring now to the drawings and particularly to FIGURE 1, the reference character 11 indicates the rearward portion of a side frame rail of a motor vehicle frame. A frame bracket 12 is mounted upon the inner side of the frame rail 11 and provides a pivotal connection 13 for the forward end of a trailing type suspension arm 14.

At its rearward end, the trailing suspension arm 14 is connected to the rear axle 16. The axle includes an axle tube 17 and an axle shaft 18 with the tube being supported upon a mounting bracket 19 secured to the suspension arm by means of a U-bolt 21. Rubber pucks 22 are utilized to insulate the axle from the suspension arm.

It will be understood that a similar construction is utilized at each side of the vehicle to form a complete suspension for the rear axle 16 and the rear road wheels (not shown), the latter being driven by the axle shafts 18.

An air spring 23 forms the spring medium for each suspension arm 14. Each air spring includes an upper housing 24 secured to the side frame rail 11 by means of brackets 26 and 27. The upper housing 24 is hollow and is open at its lower end to receive a hollow pedestal 28 supported at its lower end upon a ball joint 29 carried by a bracket 31 mounted upon the suspension arm 14. A rubber diaphragm 32 interconnects the upper housing 24 and the pedestal 28 of the air spring to form an enclosed airtight connection therebetween which accommodates relative movement between the two.

Figure 2:
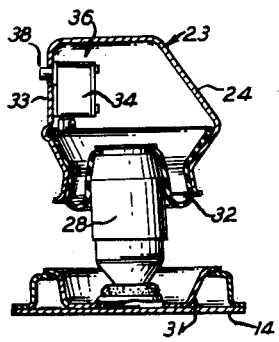
FIGURE 2 is a transverse cross-sectional view taken on the line 2—2 of FIGURE 1.

As best seen in FIGURE 2, the inner side wall 33 of the upper housing 24 is flat and supports the valve housing 34 of the leveling valve 36. The valve housing is generally rectangular and has opposite flat sides with one side positioned adjacent the side wall 33 of the air spring and suitably secured thereto.

An actuating shaft 37 extends through the valve housing 34 and has a portion 38 projecting through an aperture in the air spring side wall 33. As best seen in FIGURES 1 and 3, the extending portion 38 of the actuating shaft has a flat portion 39 supporting one end of a flexible actuating arm 41 which is secured thereto by means of a bolt 42. The opposite end of the flexible actuating arm 41 is connected to an adjustable link 43, the lower end of which is pivotally connected at 44 to a bracket 46 mounted on the trailing arm 14.

Referring now to FIGURES 3 and 4, a pair of removable fittings 47 and 48 are threaded into a cross bore 49 formed in the valve housing 34. The bore 49 intersects a vertical chamber 51 having its lower end closed by a fitting 52 openings into the interior of the air spring 23.

The fitting 47 is formed with an inlet passageway 53 controlled by an inlet air valve 54 having an actuating pin 56 at one end adapted to be engaged by a valve actuating lever 57. The upper end of the lever 57 is threaded into the actuating shaft 38. The inlet passageway 53 is suitably connected to a pressure tank 58 charged by an air pump 59.

Similarly, the fitting 48 is provided with an outlet passageway 61 containing an outlet air valve 62 having an actuating pin 63 at its inner end for engagement by the valve actuating member 57. The passageway 61 is suitably connected to exhaust.

A small clearance is provided between the lower end of the valve actuating member 57 and adjacent actuating pins 56 and 63 of the inlet and outlet valves respectively so that one or the other of the valves will be opened upon a predetermined movement of the valve actuating member 57 in either direction.

The valve housing 34 also contains an elongated fluid chamber 64 adjacent the chamber 51. The inner end 66 of the actuating shaft 38 is reduced in diameter and projects into the upper end of the fluid chamber 64. The shaft is also formed with a diametral slot 67 receiving the upper end of a flat vane 68. It will be seen that the vane 68 is considerably smaller in the cross-sectional area than the cross-sectional area of the fluid chamber 64 so that a relatively large clearance space 69 is provided between the edges of the vane and the walls of the chamber.

A U-shaped spring steel member 71 embraces the vane 68 and is formed with a central cylindrical portion 72 encircling the reduced end of portion 66 of the actuating shaft and interconnecting integral leg portions 73 which engage opposite sides of the vane 68. It will be noted from FIGURE 3 that the leg portions 73 of the spring steel member are but slightly smaller in area than the cross-sectional area of the fluid chamber 64 to provide restricted openings 74 between the leg portions 73 and the walls of the fluid chamber.

The two leg portions 73 form auxiliary vanes and it will be noted from FIGURE 5 that the lower ends of the auxiliary vanes engage an inwardly projecting rib 76 of the valve housing to form a stop therefor and to normally position the main vane 68 and the auxiliary vanes 73 in a central neutral position.

In operation, any change in the relative position between the vehicle frame and the road wheel will result in rotation of the actuating shaft 38 of the leveling valve. This rotation of the valve actuating shaft is resisted by the damping action provided by the auxiliary vanes 68 and 73.

During a damped stroke, as seen in FIGURE 6, one of the auxiliary vanes 73 moves away from its stop 76 under the actuation of the main vane 68 which is secured to the valve shaft 38. During this movement the restricted opening 74 adjacent the edges of the auxiliary vane 73 retards the movement of the auxiliary vane within the chamber 64, which is filled with a low temperature variation fluid. Consequently, during short duration changes in the relative position between the vehicle frame and the road wheel, such as occur during encounter of the road wheel with road irregularities, the resulting vertical movement of the link 43 of FIGURE 1 is not translated into rotation of the valve actuating shaft 38 since one of the auxiliary vanes 73 dampens and resists this action. Instead, the movement is absorbed within the flexible arm 41 and, consequently, a time delay feature is provided which prevents unwanted correction in the riding height of the air spring 23 due to temporary changes in the relationship between the vehicle frame and the road wheel. The leveling valve, however, is responsive to changes in the vehicle loading since sufficient time is then available to move one of the vanes 73 within the fluid chamber and to open the corresponding inlet or outlet ports as the case may be.

As soon as the relationship between the vehicle frame and the road wheel returns to its initial predetermined relationship, either as the result of a correction in the vehicle riding height by admitting air into or exhausting air from the air spring, or by ending of a temporary change in the vehicle attitude due to road irregularities or the like, the valve actuating shaft 38 may be rapidly returned to its neutral position since the vane 68 carried thereby is considerably smaller in area than the cross-sectional area of the fluid chamber 64 so that it is relatively unretarded in its return movement. During this return movement the vane 68 leaves the auxiliary vane 73, and the latter returns to its neutral position slower due to the more restricted opening between the auxiliary vane and the walls of the chamber. The rapid return of the main vane 68 and the actuating shaft 38 prevents the hunting effect common with this type of leveling valve and provides greater stability of operation.

An optional feature is shown in the drawings in the form of an opening 77 in each of the auxiliary vanes 73. During the damping stroke of the main vane 68 it will be seen that the opening 77 is closed by the main vane so that only the restricted opening 74 around the periphery of the auxiliary vane 73 is available for the passage of fluid from one side of the vane to the other. During the return stroke of the vanes in which the main vane 68 returns rapidly and leaves the auxiliary vane 73, it will be seen that the opening 77 is uncovered to enable the auxiliary vane to return more rapidly to its neutral position.

It will be understood that the invention is not to be limited to the exact construction shown and described, but that various changes and modifications may be made without departing from the spirit and scope of the invention, as defined in the appended claims.

What is claimed is:

1. In a motor vehicle having a chassis member resiliently supported upon a wheel member by means of an air spring, and a source of air under pressure for charging said air spring, a leveling valve assembly having a housing mounted in fixed relationship to one of said members, valve mechanism within said housing, an actuating member, means operatively connecting said actuating member to the other of said members to be responsive to relative movement between said members and arranged to operate said valve mechanism, said valve housing having a fluid chamber, a vane type damping member movable in said fluid chamber upon movement of said actuating member, said damping member being considerably smaller in effective area than the cross-sectional area of said chamber taken along a plane perpendicular to the direction of movement of said damping member, and an auxiliary vane type damping member having a larger area only slightly smaller than the cross sectional area of said chamber, said auxiliary damping member being positioned adjacent one side of said damping member and movable therewith in one direction to retard the movement of said damping member but separable therefrom in the other direction to permit an independent and faster return of said damping member.

2. The structure defined by claim 1 which is further characterized in that said auxiliary damping member is normally spring urged into engagement with one side of said damping member.

3. The structure defined by claim 1 which is further characterized in that a spring urged vane type auxiliary damping member is positioned adjacent each side of said damping member so that one of said auxiliary members will be movable with said damping member in each direction of movement thereof.

4. The structure defined by claim 3 which is further characterized in that stop means are provided engageable with each of said auxiliary damping members in their neutral inoperative positions to prevent following movement of one of said auxiliary damping members in each direction of movement of said damping member.

5. In a motor vehicle having a chassis member resiliently supported upon a wheel member by means of an air spring, and a source of air under pressure for charging said air spring, a leveling valve assembly having a housing mounted in fixed relationship to one of said members, an actuating member, means operatively connecting said actuating member to the other of said members to be responsive to relative movement between said members, inlet and outlet valves associated with said leveling valve assembly and arranged to be selectively operated by movement of said actuating member in opposite directions, said housing having a fluid chamber, a pair of flat juxtaposed vane type damping members movable in said fluid chamber upon movement of said actuating member, said damping members having different effective damping areas and movable together in one direction of movement of said actuating member to dampen said movement and separable from each other in the opposite direction of movement to permit an independent and faster return of the smaller of said damping members, said pair of damping members being in substantially flush engagement under static conditions.

6. In a motor vehicle having a chassis member resiliently supported upon a wheel member by means of an air spring, and a source of air under pressure for charging said air spring, a leveling valve assembly having a housing mounted in fixed relationship to one of said members, an actuating shaft journaled in said housing, means operatively connecting said shaft to the other of said members to be responsive to relative movement between said members, inlet and outlet valves, means on said shaft for operating said valves, said valve housing having a fluid chamber, a vane attached to said actuating shaft and movable within said chamber, a flat auxiliary vane positioned adjacent each side of said first mentioned vane and spring urged toward said first named vane, each of said auxiliary vanes having a restricted opening retarding the passage of fluid between opposite sides of said auxiliary vanes, said first named vane being smaller in effective area than the effective area of said auxiliary vanes to permit a faster return of said first named vane.

7. The structure defined by claim 6 which is further characterized in that each said auxiliary vane has an opening therein normally covered by said first named vane during movement of the latter away from its neutral position, but uncovered upon the return movement of said vanes.

8. In a motor vehicle having a chassis member resiliently supported upon a wheel member by means of an air spring, and a source of air under pressure for said air spring, leveling valve mechanism mounted in fixed relationship to one of said members, actuating means for said valve mechanism operatively connected to the other of said members to be responsive to relative movement between said members, a fluid chamber, and a pair of auxiliarly damping members for said valve mechanism oscillatable in said fluid chamber about a common axis, a main damping member connected to said actuating means and oscillatable about said common axis, said auxiliary damping members having different effective areas than said main damping member and each being separable from said main damping member in opposite directions of movement to permit a faster movement in said direction.

9. The structure defined by claim 8 which is further characterized in that said damping members are substantially flat vanes, the smaller of said vanes being a relatively rigid member and the larger of said vanes being resiliently urged toward said smaller vane.

10. In a motor vehicle having a chassis member resiliently supported upon a wheel member by means of an air spring, and a source of air under pressure for said air spring, leveling valve mechanism mounted in fixed relationship to one of said members, actuating means for said valve mechanism operatively connected to the other of said members to be responsive to relative movement between said members, a closed fluid chamber, a damping member in said fluid chamber operatively connected to said actuating means for oscillation about an axis, said damping member having an effective area in a plane containing said axis greater than half the effective area of said fluid chamber in said plane, and a damping vane in said fluid chamber of greater effective area than said damping member, said damping vane being resiliently urged into engagement with said oscillatable damping member for movement thereby.

11. The structure defined in claim 10 which is characterized in that said damping vane is mounted independently of said damping member for oscillation about the axis of said damping member.

12. In a motor vehicle having a chassis member resiliently supported upon a wheel member by means of an air spring, and a source of air under pressure for charging said air spring, a leveling valve assembly having a housing mounted in fixed relationship to one of said members, an actuating shaft journaled in said housing, means operatively connecting said shaft to the other of said members to be responsive to relative movement between said members, inlet and outlet valves, means on said shaft for operating said valves, said valve housing having a fluid chamber, a vane attached to said actuating shaft and movable within said chamber, a flat auxiliary vane positioned adjacent one side of said first mentioned vane and spring urged toward said first named vane, said auxiliary vane having a restricted opening retarding the passage of fluid between opposite sides of said auxiliary vane, said first named vane being smaller in effective area than the effective area of said auxiliary vane to permit a faster return of said first named vane, said auxiliary vane comprising a generally U-shaped spring steel member having opposed leg portions embracing opposite sides of said first named vane, each of said leg portions having a greater effective area than the effective area of said first named vane.

13. A damper mechanism comprising an elongated fluid chamber, a shaft rotatably disposed at one end of said chamber, a first vane having one end attached to said shaft and swingable from one side of said chamber to the other, the arcuate end of said vane being spaced from the arcuate end of said chamber, a second vane disposed to one side of said first vane and of greater length than said first vane, a stop member secured to the said other end of said chamber, said stop member being constructed to limit the path of swinging movement of said second vane to one half of said chamber.

14. A damper mechanism comprising an elongated fluid chamber, a shaft rotatably disposed at one end of said chamber, a first vane having one end attached to said shaft and swingable from one side of said chamber to the other, the other end of said vane being spaced from the other end of said chamber, a pair of second vanes disposed one on each side of said first vane, a stop member secured to the said other end of said chamber, said second vanes being of greater length than said first vane and constructed to engage said stop member to limit the path of swinging movement of said second vanes.

References Cited by the Examiner

UNITED STATES PATENTS

| 751,576 | 2/04 | Veeder. | |
|---|---|---|---|
| 1,369,946 | 3/21 | Tibbetts | 188—89 |
| 1,540,341 | 6/25 | Kirby. | |
| 1,690,113 | 11/28 | Hooton | 188—89 |
| 1,821,142 | 9/31 | Davis | 188—89 |
| 1,834,112 | 12/31 | Tibbetts | 188—89 |
| 3,082,018 | 3/63 | Smirl | 280—124 |

FOREIGN PATENTS

| 375,294 | 6/32 | Great Britain. |
|---|---|---|
| 444,540 | 3/36 | Great Britain. |
| 600,147 | 11/25 | France. |

OTHER REFERENCES

Auer, German printed application H17,488 11/63c, Mar. 1, 1956.

ARTHUR L. LA POINT, *Primary Examiner.*

WILLIAM J. KANOF, JACOB A. MANIAN,
*Examiners.*